(12) United States Patent
Li

(10) Patent No.: US 7,624,686 B2
(45) Date of Patent: Dec. 1, 2009

(54) PERMANENT MAGNETIC LEVITATION BOGIE APPARATUS

(76) Inventor: Lingqun Li, Tower A, Bldg., No. 14, Chuangye Yuan, Shuang D Gang, Gaoxinyuanqu, No. 12 Liaohedonglu, Dilian (CN) 116620

( * ) Notice: Subject to any disclaimer, the term of this patent is extended or adjusted under 35 U.S.C. 154(b) by 202 days.

(21) Appl. No.: 11/466,693

(22) Filed: Aug. 23, 2006

(65) Prior Publication Data

US 2007/0044677 A1    Mar. 1, 2007

(30) Foreign Application Priority Data

Aug. 25, 2005    (CN)    .................. 2005 1 0093322

(51) Int. Cl.
*B60L 13/04* (2006.01)
(52) U.S. Cl. ..................................... 104/281
(58) Field of Classification Search ................. 104/281, 104/282, 283, 287, 288, 290
See application file for complete search history.

(56) References Cited

U.S. PATENT DOCUMENTS

| | | | |
|---|---|---|---|
| 3,791,308 A | 2/1974 | Hartz |
| 4,702,173 A | 10/1987 | Perrott |
| 4,776,282 A | 10/1988 | Ishikura et al. |
| 5,454,328 A | 10/1995 | Matsuzaki et al. |
| 5,467,718 A | 11/1995 | Shibata et al. |
| 5,473,209 A | 12/1995 | Lamb |
| 5,477,093 A | 12/1995 | Lamb |
| 5,477,094 A | 12/1995 | Lamb |
| 5,668,424 A | 9/1997 | Lamb |
| 5,691,587 A | 11/1997 | Lamb |
| 5,712,519 A | 1/1998 | Lamb |
| 5,712,520 A | 1/1998 | Lamb |
| 5,739,627 A | 4/1998 | Lamb |

(Continued)

FOREIGN PATENT DOCUMENTS

CN    1264660 A    8/2000

(Continued)

OTHER PUBLICATIONS

Qingchao Wei et al., *Magnetic Levitation Railway System and Technique*, China Science and Technology Publishing Company, pp. 19 and 23, Nov. 2003 (with partial English translation).

(Continued)

*Primary Examiner*—S. Joseph Morano
*Assistant Examiner*—Robert J McCarry, Jr.
(74) *Attorney, Agent, or Firm*—Workman Nydegger

(57) ABSTRACT

A magnetic levitation bogie apparatus includes an upper inner circular ring permanent magnet mounted onto a bottom surface of a chassis; a bogie located below the chassis; a lower inner circular ring permanent magnet mounted onto an upper surface of the bogie, and aligned substantially with and spaced from the upper inner permanent magnet at a predetermined distance; an upper sleeve being mounted onto the chassis and coaxial with the upper inner permanent magnet; a lower sleeve being mounted onto the bogie and coaxial with the lower inner permanent magnet; and a rotation shaft coupled between the upper sleeve and the lower sleeve. The bogie apparatus of the present invention is simple in structure, long in life duration, low in cost, superior in vibration-damping effect, thus achieving good comfortableness of the vehicle.

16 Claims, 2 Drawing Sheets

U.S. PATENT DOCUMENTS

| | | |
|---|---|---|
| 5,778,796 A | 7/1998 | Kim |
| 5,834,872 A | 11/1998 | Lamb |
| 5,880,548 A | 3/1999 | Lamb |
| 5,903,075 A | 5/1999 | Lamb |
| 5,909,073 A | 6/1999 | Lamb |
| 5,992,575 A | 11/1999 | Kim |
| 6,005,317 A | 12/1999 | Lamb |
| 6,043,578 A | 3/2000 | Lamb |
| 6,072,258 A | 6/2000 | Lamb |
| 6,095,054 A | 8/2000 | Kawano et al. |
| 6,240,852 B1 | 6/2001 | Camp |
| 6,242,832 B1 | 6/2001 | Lamb |
| 6,337,527 B2 | 1/2002 | Lamb |
| 6,510,799 B2 | 1/2003 | Lamb et al. |
| 6,543,591 B2 | 4/2003 | Kuzuya |
| 6,644,208 B2 | 11/2003 | Akiyama |
| 6,873,235 B2 * | 3/2005 | Fiske et al. ............ 335/306 |
| 6,899,036 B2 | 5/2005 | Lamb et al. |
| 7,204,192 B2 * | 4/2007 | Lamb et al. ............ 104/282 |
| 7,243,604 B2 | 7/2007 | Li |
| 2003/0084115 A1 | 5/2003 | Wood et al. |
| 2003/0205163 A1 | 11/2003 | Lamb et al. |
| 2005/0034628 A1 | 2/2005 | Lamb et al. |
| 2005/0223934 A1 | 10/2005 | Li |
| 2005/0252407 A1 | 11/2005 | Li |
| 2006/0219128 A1 | 10/2006 | Li |
| 2006/0236890 A1 | 10/2006 | Lamb et al. |
| 2006/0244322 A1 | 11/2006 | Li |

FOREIGN PATENT DOCUMENTS

| | | |
|---|---|---|
| CN | 1490207 A | 4/2004 |
| CN | 1746046 A | 3/2006 |

OTHER PUBLICATIONS

Photograph of levitation device provided by Magna Force, Inc. publication date unknown.

* cited by examiner

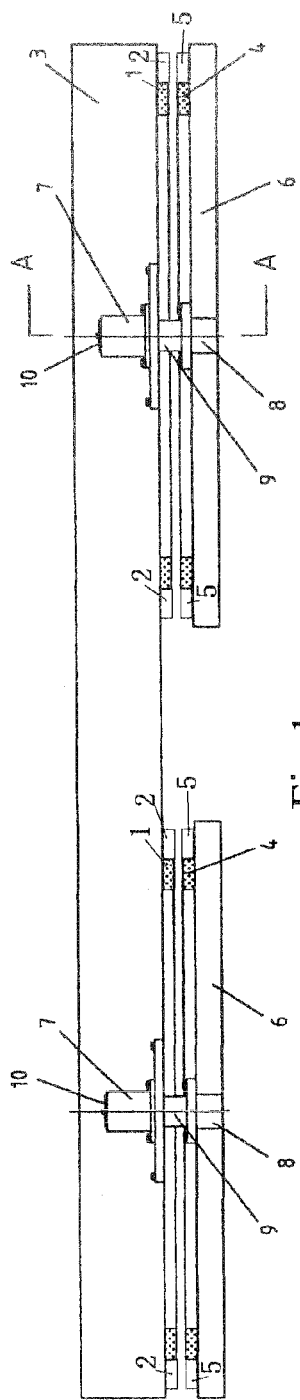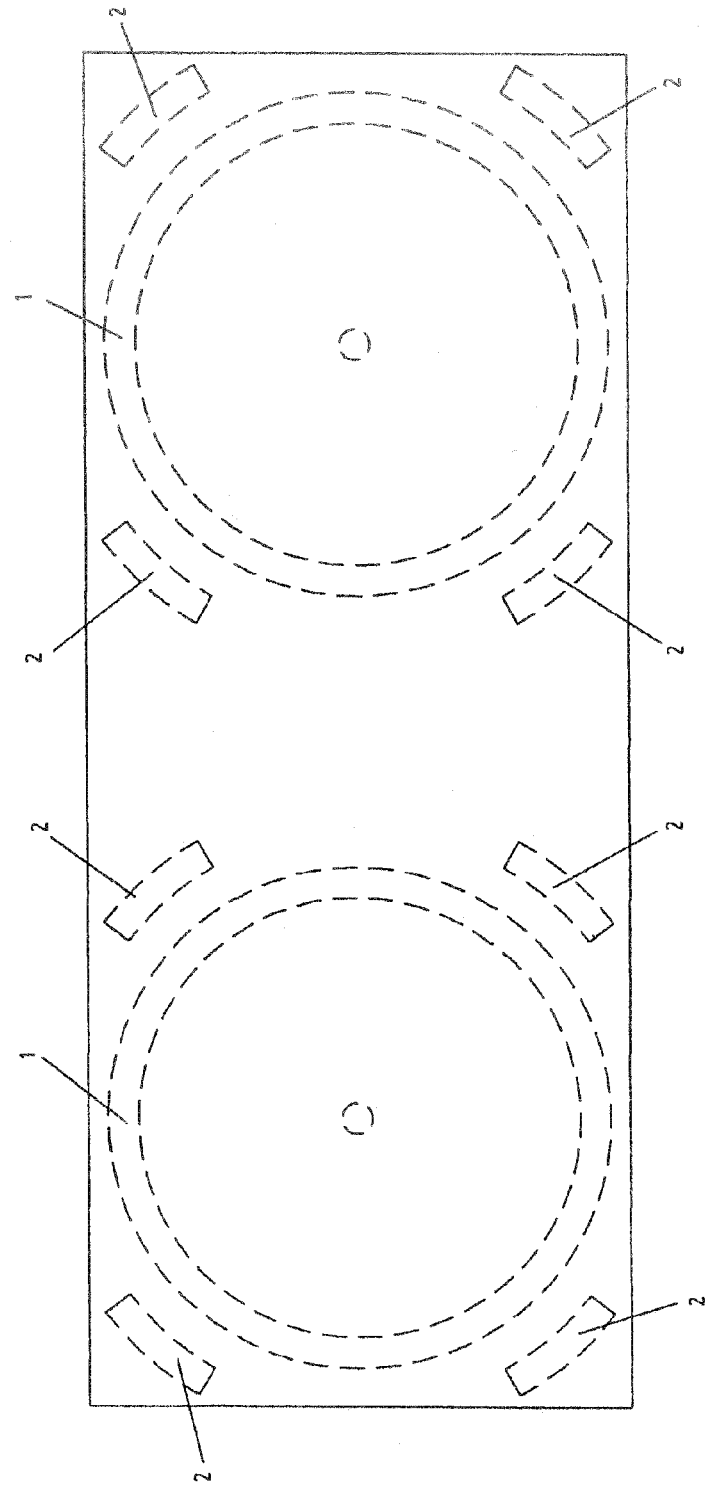
Fig.1a
Fig.1b

PERMANENT MAGNETIC LEVITATION BOGIE APPARATUS

CROSS-REFERENCE TO RELATED APPLICATIONS

This application claims the priority of Chinese Application Serial No. 200510093322.6, filed Aug. 25, 2005, which for purposes of disclosure is incorporated herein by specific reference.

BACKGROUND OF THE INVENTION

1. The Field of the Invention

The present invention relates to a bogie apparatus for a vehicle such as a wheeled train, a bus or a magnetic levitation train, and, more particularly, to permanent magnetic levitation bogie apparatus.

2. The Relevant Technology

Generally, in order to ensure good steering and slope-climbing performance of a wheeled train, a magnetic levitation train or a long vehicle, a bogie is disposed below the chassis of these vehicles.

Conventionally, springs are provided on the bogie and the chassis is pressed on the springs. Additionally, the chassis and the bogie are connected coaxially to each other via a shaft. The bogie located below the chassis can rotate horizontally and can tilt slightly vertically, so that the vehicle can run along a curved and/or sloping way.

The above mentioned bogie is widely used in the existing wheeled trains, magnetic levitation trains and long vehicles.

However, the above conventional bogie is of mechanical type, has a complicated structure and is poor in comfortableness. In addition, the conventional mechanical type bogie is high in cost and short in life duration.

SUMMARY OF THE INVENTION

An aspect of the present invention is to solve all or at least parts of the above disadvantages of conventional bogies.

Accordingly, one embodiment of the present invention provides a bogie apparatus, comprising:

an upper inner permanent magnet which is in the form of a circular ring and mounted onto a bottom surface of a chassis;

a bogie located below the chassis;

a lower inner permanent magnet which is in the form of a circular ring and mounted onto an upper surface of the bogie, has inner and outer diameters identical respectively with that of the upper inner permanent magnet, and is aligned substantially with and spaced from the upper inner permanent magnet at a predetermined distance, in which magnetic poles of the lower and upper inner permanent magnets have the same polarity face each other so that a levitating repulsive force is generated therebetween;

an upper sleeve being mounted onto the chassis and coaxial with the upper inner permanent magnet;

a lower sleeve being mounted onto the bogie and coaxial with the lower inner permanent magnet; and a rotation shaft, one end of which is fitted into the upper sleeve so as to be rotatable and slidable in an axial direction thereof within the upper sleeve and the other end thereof is fixed into the lower sleeve.

Preferably, the bogie apparatus further comprises a position limit cover located at a top end of the upper sleeve and connected to the rotation shaft so as to prevent the rotation shaft from being drawn out of the upper sleeve.

Further, the bogie apparatus further comprises: an upper outer permanent magnet which is in the form of a circular ring, has an inner diameter larger than the outer diameter of the upper inner permanent magnet, and is mounted onto the lower surface of the chassis coaxially with the upper inner permanent magnet; and a lower outer permanent magnet which is in the form of a circular ring, has an inner diameter larger than the outer diameter of the lower inner permanent magnet, and has inner and outer diameters identical respectively with that of the upper outer permanent magnet, the lower outer permanent magnet being mounted onto the upper surface of the bogie coaxially with the lower inner permanent magnet and being aligned substantially with and spaced from the upper outer permanent magnet at the predetermined distance, in which magnetic poles of the lower and upper outer permanent magnets have the same polarity face each other.

Preferably, each of the upper and lower outer permanent magnets comprises a plurality of circular arc magnet segments having identical inner and outer diameters with each other and disposed circumferentially on a same circle, in which the number of the circular arch magnet segments of the upper outer permanent magnet is identical with that of the circular arch magnet segments of the lower outer permanent magnet and the circular arch magnet segments of the upper outer permanent magnet are aligned substantially with that of the lower outer permanent magnet respectively.

Further, each of the upper and lower outer permanent magnets comprises four circular arc magnet segments.

Preferably, the predetermined distance is substantially within a range of approximately 3 mm to 100 mm.

Additionally, a bush is disposed between the upper sleeve and the rotation shaft so as to alleviate abrasion between the upper sleeve and the rotation shaft.

Further, each of the upper and lower inner permanents and the upper and lower outer permanents is made of NdFeB permanent magnetic material.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

FIG. 1a is a structural side view of the permanent magnetic levitation bogie apparatus according to an embodiment of the present invention;

FIG. 1b is a plane view of the permanent magnetic levitation bogie apparatus of FIG. 1a; and FIG. 2 is sectional view taken along line A-A in FIG. 1a.

DETAILED DESCRIPTION OF THE PREFERRED EMBODIMENTS

Figure 2:
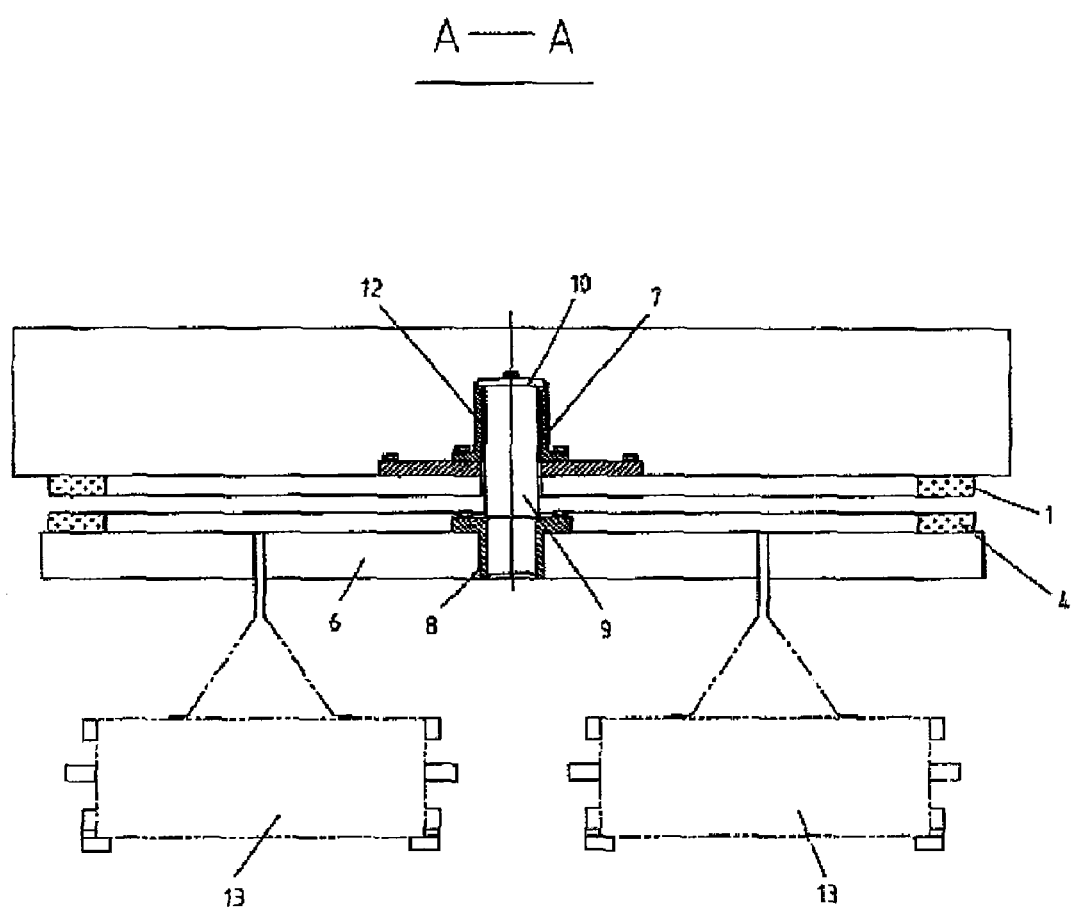

Embodiments of the present invention will be described in detail with reference to the accompany drawings, the embodiments described herein are explanatory and illustrative and shall not be construed to limit the present invention. The same elements are denoted by like reference numerals throughout the following descriptions.

FIGS. 1a and 1b are side and plane views of a permanent magnetic levitation bogie apparatus according to an embodiment of the present invention, respectively. In FIGS. 1a and 1b, two permanent magnetic levitation bogie apparatuses are provided on two sides of the lower surface of a chassis. The two bogie apparatuses are completely identical with each other, so that only one of the bogie apparatuses is described in detail below for the purpose of briefness.

Generally, the permanent magnetic levitation bogie apparatus according to the embodiment of the present invention substantially comprises two parts: a levitation permanent magnet part and a rotation shaft-sleeve support part.

More particularly, the permanent magnetic levitation bogie apparatus according to the embodiment of the present invention comprises a chassis 3 of a vehicle such as a magnetic levitation train; a bogie 6 located below the chassis 3; an upper inner permanent magnet 1 and an upper outer permanent magnet 2 which are mounted coaxially onto a lower surface of the chassis 3; a lower inner permanent magnet 4 and a lower outer permanent magnet 5 which are mounted coaxially onto an upper surface of the bogie 6; an upper sleeve 7 being mounted onto the chassis 3; a lower sleeve 8 being mounted onto the bogie 6; and a rotation shaft 9, in which one end of the rotation shaft 9 is fitted into the upper sleeve 7 so as to be rotatable and slidable in an axial direction thereof within the upper sleeve 7 and the other end thereof is fixed into the lower sleeve 8.

The upper and lower inner permanent magnets 1, 4 are in the form of circular ring, respectively, more particularly in the form of continuously circular ring, and the upper and lower outer permanent magnets 2, 5 are in the form of circular ring, respectively. Preferably, each of the upper and lower outer permanent magnets 2, 5 is in the form of discontinuous circular ring and comprises a plurality of circular arc magnet segments having identical inner and outer diameters with each other. The plurality of circular arc magnet segments of each of the upper and lower outer permanent magnets 2, 5 are disposed circumferentially on the same circle with equal intervals.

As shown in FIG. 1b, the number of the circular arc magnet segments of each of the upper and lower outer permanent magnets 2, 5 is four, but the present invention is not limited to this. The circular arc magnet segments can be of any suitable number. However, the number of the circular arc magnet segments of the upper outer permanent magnet 2 should be identical with that of the lower outer permanent magnet 5.

The upper outer permanent magnet 2 is positioned outside and coaxial with the upper inner permanent magnet 1. That is, the inner diameter of the upper outer permanent magnet 2 is larger than the outer diameter of the upper inner permanent magnet 1, and the upper inner permanent magnet 1 is concentric with the upper outer permanent magnet 2. The upper sleeve 7 is mounted onto the chassis 3 at the center of the upper inner permanent magnet 1 and the upper outer permanent magnet 2. That is, the upper sleeve 7 is coaxial with the upper inner permanent magnet 1 and the upper outer permanent magnet 2.

Similarly, the lower outer permanent magnet 5 is positioned outside of and coaxial with the lower inner permanent magnet 4. That is, the inner diameter of the lower outer permanent magnet 5 is larger than the outer diameter of the lower inner permanent magnet 4, and the lower inner permanent magnet 4 is concentric with the lower outer permanent magnet 5. The lower sleeve 8 is mounted onto the bogie 6 at the center of the lower inner permanent magnet 4 and lower outer permanent magnet 5. That is, the lower sleeve 8 is coaxial with the lower inner permanent magnet 4 and lower outer permanent magnet 5.

One end (lower end in FIG. 1a) of the rotation shaft 9 is fixed in the lower sleeve 8 and the other end (upper end in FIG. 1a) thereof is inserted into the upper sleeve 7 so as to be rotatable and slidable within the upper sleeve 7. The chassis 3 located above and the bogie 6 located below are connected via the rotation shaft 9 and can rotate relative to each other.

After the chassis 3 and the bogie 6 are connected via the rotation shaft 9, the upper inner permanent magnet 1 and the upper outer permanent magnet 2, which are mounted onto the chassis 3, are aligned with the lower inner permanent magnet 4 and the lower outer permanent magnet 5 which are mounted onto the bogie 6, respectively. Moreover, the magnetic poles of the upper and lower inner permanent magnets 1, 4 have the same (magnetic) polarity facing each other, and the magnetic poles of the upper and lower outer permanent magnets 2, 5 have the same (magnetic) polarity facing each other too.

In other words, the upper and lower inner permanent magnets 1, 4 have substantially identical inner and outer diameters, as shown in the plane view of FIG. 1b, the upper inner permanent magnets 1 is superposed on the lower inner permanent magnet 4, and the upper outer permanent magnet 2 is superposed on the lower outer permanent magnet 5.

More particularly, each of the upper and lower outer permanent magnets 2, 5 comprises four circular arc magnet segments having identical inner and outer diameters with each other, and the four circular arc magnet segments of the upper outer permanent magnet 2 are disposed circumferentially on the same circle with equal intervals and aligned respectively with (superposed on, in plane view) the four circular arc magnet segments of the lower outer permanent magnet 5.

It can be seen from FIG. 2 that the chassis 3 is levitated above the bogie 6, such that the upper inner permanent magnet 1 is aligned with and spaced from the lower inner permanent magnet 4 at a predetermined distance (levitation gap), and the upper outer permanent magnet 2 is aligned with and spaced from the lower outer permanent magnet 5 at the predetermined distance. Preferably, the upper inner permanent magnet 1 and the upper outer permanent magnet 2 have substantially identical thickness, and the lower inner permanent magnet 4 and the lower outer permanent magnet 5 have substantially identical thickness. In addition, the predetermined distance (levitation gap) is preferably within a range of 3 mm to 100 mm.

When the vehicle is off load, the levitation gap reaches its maximum value. When the load of the vehicle reaches the design load of the vehicle, the levitation gap is between 40 mm to 50 mm. In extreme case, the levitation gap is permitted to reach its minimum vale of 3 mm.

In a further preferable embodiment of the present invention, the bogie apparatus comprises a position limit cover 10 which is located at a top end of the upper sleeve 7 and connected to the top end of the rotation shaft 9 so as to prevent the rotation shaft 9 from being drawn out of the upper sleeve 7.

According to the present invention, each of the upper and lower inner permanents and the upper and lower outer permanents is made of NdFeB permanent magnetic material, but the present invention is not limited to this.

Preferably, in order to facilitate the rotation of the rotation shaft 9 within the upper sleeve 7 and decrease the friction between the rotation shaft 9 and the upper sleeve 7, a bush 12 is disposed between the rotation shaft 9 and the inner surface of the upper sleeve 7.

For example, when the bogie apparatus according to the present invention is applied to the magnetic levitation train, the levitation power cabin 13 for supplying power to the train is connected to and located below the bogie 6. The levitation power cabin 13 is known in the art and detailed descriptions thereof are omitted here.

With the bogie apparatus of the present invention having the above structure, the upper and lower inner permanent magnets 1, 4 as well as the upper and lower outer permanent magnets 2, 5 are in strict correspondence with each other by using the rotation shaft 9, and will not be offset horizontally from each other during rotation and/or titling of the bogie 6.

In addition, because the upper and lower inner permanent magnets 1, 4 as well as the upper and lower outer permanent magnets 2, 5 are opposed to each other with their magnetic poles having the same polarity facing each other, so that a levitation repulsive force is generated between the chassis and the bogie so as to levitate the main body of the vehicle. The levitation repulsive force decreases as the levitation gap increases. And the relationship between the levitation repulsive force and the levitation gap satisfies a rule of power function. With the magnetic field generated by the permanent magnets in the form of a circular ring, the area of the chassis to which the levitation force is applied is large. The load is dispersive so that the structural fatigue does not tend to occur in the bogie apparatus.

The bogie apparatus according to the present application is applicable to wheeled trains, magnetic levitation trains, and lengthened buses, and the following advantages can be achieved:

1. The structure of the bogie apparatus is simple; while the friction force is small, the rotation of the bogie is smooth, and the life duration is long.

2. The area of the chassis and the bogie to which the levitation force is applied is large and the load is dispersive. The vibration cannot be transmitted between the chassis and the bogie because of the levitation gap, so that resonance effect will not occur, and the bogie apparatus is safe, thereby the comfortableness of the vehicle is improved.

3. The bogie apparatus is easy to be manufactured and low in cost.

While preferred embodiments of the invention have been described and illustrated above, it should be understood that these are exemplary of the invention and are not to be considered as limitations. Additions, omissions, substitutions and other modifications can be made without departing from the sprit or scope of the present invention. Accordingly, the invention is not to be considered as being limited by the foregoing description, and is only limited by the scope of the appended claims and the equivalents thereof.

The invention claimed is:

1. A bogie apparatus comprising:
    an upper inner permanent magnet which is in the form of a circular ring and mounted onto a bottom surface of a chassis;
    a bogie located below the chassis;
    a lower inner permanent magnet which is in the form of a circular ring and mounted onto an upper surface of the bogie, has inner and outer diameters identical with those of the upper inner permanent magnet respectively, and is aligned substantially with and spaced from the upper inner permanent magnet at a predetermined distance, in which magnetic poles of the lower and upper inner permanent magnets have the same polarity facing each other so that a levitating repulsive force is generated therebetween;
    an upper sleeve being mounted onto the chassis and coaxial with the upper inner permanent magnet;
    a lower sleeve being mounted onto the bogie and coaxial with the lower inner permanent magnet;
    a rotation shaft, one end of which is fitted into the upper sleeve so as to be rotatable and slidable in an axial direction thereof within the upper sleeve and the other end of which is fixed into the lower sleeve, wherein the chassis located above and the bogie located below are connected via the rotation shaft and can rotate relative to each other; and
    a position limit cover located at a top end of the upper sleeve and connected to the rotation shaft so as to prevent the rotation shaft from being drawn out of the upper sleeve.

2. The bogie apparatus according to claim 1, further comprising:
    an upper outer permanent magnet which is in the form of a circular ring, has an inner diameter larger than the outer diameter of the upper inner permanent magnet, and is mounted onto the lower surface of the chassis coaxially with the upper inner permanent magnet; and
    a lower outer permanent magnet which is in the form of a circular ring, has an inner diameter larger than the outer diameter of the lower inner permanent magnet, and has inner and outer diameters identical with those of the upper outer permanent magnet respectively; the lower outer permanent magnet being mounted onto an upper surface of the bogie coaxially with the lower inner permanent magnet and being aligned substantially with and spaced from the upper outer permanent magnet at the predetermined distance, in which magnetic poles of the lower and upper outer permanent magnets having the same polarity facing each other.

3. The bogie apparatus according to claim 2, wherein each of the upper and lower outer permanent magnets comprises a plurality of circular arc magnet segments having identical inner and outer diameters with each other and disposed circumferentially on a same circle, in which the number of the circular arc magnet segments of the upper outer permanent magnet is identical with that of the circular arc magnet segments of the lower outer permanent magnet, and the circular arc magnet segments of the upper outer permanent magnet are aligned substantially with those of the lower outer permanent magnet respectively.

4. The bogie apparatus according to claim 3, wherein each of the upper and lower outer permanent magnets comprises four circular arc magnet segments.

5. The bogie apparatus according claim 3, wherein the predetermined distance is substantially within a range of approximately 3 mm to 100 mm.

6. The bogie apparatus according to claim 5, wherein a bush is disposed between the upper sleeve and the rotation shaft.

7. The bogie apparatus according to claim 6, wherein each of the upper and lower inner permanents and the upper and lower outer permanents is made of NdFeB permanent magnetic material.

8. The bogie apparatus according claim 4, wherein the predetermined distance is substantially within a range of approximately 3 mm to 100 mm.

9. The bogie apparatus according to claim 8, wherein a bush is disposed between the upper sleeve and the rotation shaft.

10. The bogie apparatus according to claim 9, wherein each of the upper and lower inner permanents and the upper and lower outer permanents is made of NdFeB permanent magnetic material.

11. The bogie apparatus according claim 2, wherein the predetermined distance is substantially within a range of approximately 3 mm to 100 mm.

12. The bogie apparatus according to claim 11, wherein a bush is disposed between the upper sleeve and the rotation shaft.

13. The bogie apparatus according to claim 12, wherein each of the upper and lower inner permanents and the upper and lower outer permanents is made of NdFeB permanent magnetic material.

14. The bogie apparatus according to claim 1, wherein the predetermined distance is substantially within a range of approximately 3 mm to 100 mm.

15. The bogie apparatus according to claim 14, wherein a bush is disposed between the upper sleeve and the rotation shaft.

16. The bogie apparatus according to claim 15, wherein each of the upper and lower inner permanents and the upper and lower outer permanents is made of NdFeB permanent magnetic material.

* * * * *

UNITED STATES PATENT AND TRADEMARK OFFICE
CERTIFICATE OF CORRECTION

| | | |
|---|---|---|
| PATENT NO. | : 7,624,686 B2 | Page 1 of 1 |
| APPLICATION NO. | : 11/466693 | |
| DATED | : December 1, 2009 | |
| INVENTOR(S) | : Lingqun Li | |

It is certified that error appears in the above-identified patent and that said Letters Patent is hereby corrected as shown below:

Column 2
Line 26, change "arch" to --arc--

Column 4
Line 44, change "in extreme case" to --in extreme cases--
Line 45, change "vale" to --value--

Signed and Sealed this

Thirty-first Day of August, 2010

David J. Kappos
*Director of the United States Patent and Trademark Office*